March 15, 1955　　　　　　　H. C. RICE　　　　　　　2,704,112
TRACTOR SEAT HAVING ADJUSTABLE SPRING SUPPORT Filed July 5, 1951　　　　　　　　　　　　　　　　2 Sheets-Sheet 1

INVENTOR.
HERBERT C. RICE
BY Gregory S. Dolgorukov
ATTORNEY.

March 15, 1955     H. C. RICE     2,704,112
TRACTOR SEAT HAVING ADJUSTABLE SPRING SUPPORT
Filed July 5, 1951     2 Sheets-Sheet 2
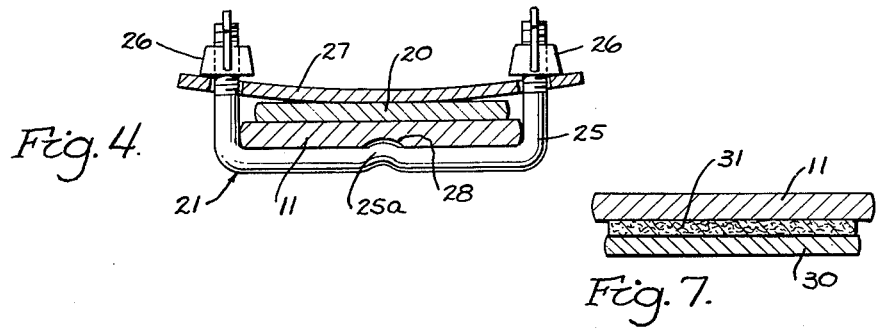
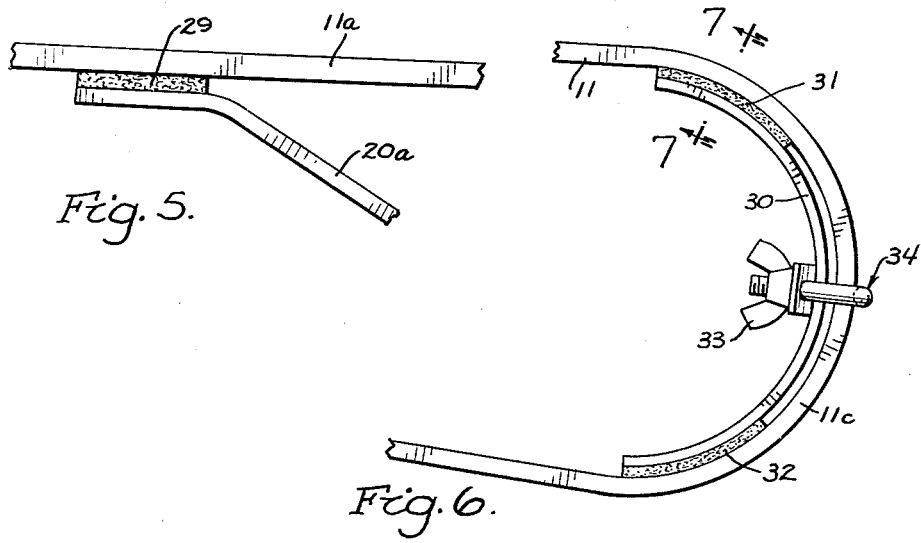
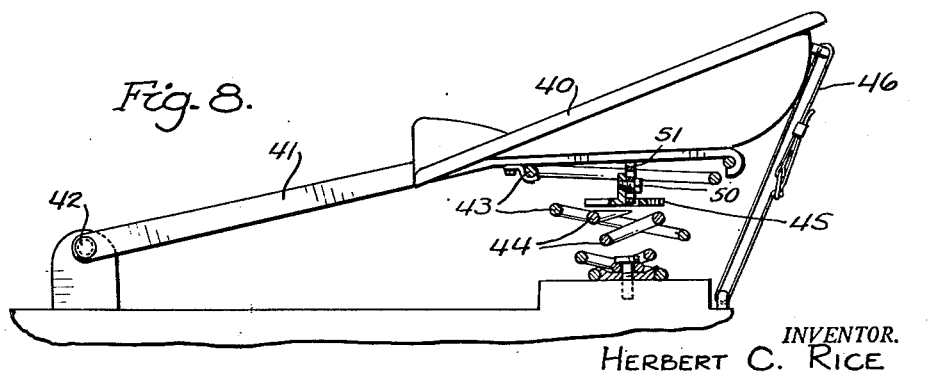
INVENTOR.
HERBERT C. RICE
BY
Gregory S. Dolgorukov
ATTORNEY.

United States Patent Office

2,704,112
Patented Mar. 15, 1955

2,704,112

TRACTOR SEAT HAVING ADJUSTABLE SPRING SUPPORT

Herbert C. Rice, Detroit, Mich.

Application July 5, 1951, Serial No. 235,175

2 Claims. (Cl. 155—51)

This invention relates to tractors and similar vehicles and more particularly to an improved seat therefor.

Great difficulties have been experienced by those skilled in art in providing a comfortable and easy riding seat for tractors and similar vehicles. The cause of said difficulties lies primarily in the conditions under which such vehicles must operate, as well as in structural limitations, and commercial requirements which such vehicles must meet.

Unlike passenger motor vehicles, tractors seldom operate over smooth road, but are used over relatively rough terrain, such as is met in road building, in ploughing and in other agricultural and similar operations. Construction of tractors usually does not include sprung bodies or floors. In tractors the seat is usually mounted on a C-shaped single leaf spring, one end of which is secured directly to the rigid tractor structure, with a metal seat pan secured to the free end of said spring. The C-shaped spring is usually made from a strip steel stock so selected as to its dimensions that the seat can support without "striking through," i. e., without the seat pan hitting the rigid structure of the tractor, drivers up to 250 pounds or even more in weight. When a tractor having a seat suspended as described above is operated in the field, constant bumps which the tractor wheels receive are transmitted to the lower end of the C-shaped spring, and by the spring to the seat and to operator's body.

It is well known that fatigue experienced by tractor operators is very severe. In fact, the problem of providing a comfortable tractor seat has reached such proportions, that establishing endowment funds in national universities for solving it has been seriously considered by the industry.

It should be appreciated that there are two main problems which must be solved by a practically acceptable construction. The first of these problems is to provide such a spring suspension for the seat, that while it does not permit "striking through" when used by a 250 pound person or even heavier, it still gives relatively "soft" ride to a person whose weight is only 110 pounds, or even less. The second problem is to check the oscillations and particularly the rebounds of the spring means, which rebounds proved to be just as serious cause of fatigue as the primary shocks transmitted to the operator's body from the wheels.

Attempts have been made to incorporate into the tractor seat suspensions hydraulic shock absorbers, such as are used in passenger motor vehicles, to cushion the primary shocks and to check the rebounds. It was found however, that due to the inherent operational characteristics of such shock absorbers, the advantages gained do not compensate sufficiently for the increase in price of such tractor seats, and for the resulting complications in construction of the seats, particularly with respect of mounting various additional parts required in such seats.

One of the objects of the present invention is to provide an improved tractor seat and a spring suspension therefor, whereby the above difficulties and disadvantages are eliminated, and a simple tractor seat of greatly superior riding characteristics is provided.

Another object of the invention is to provide an improved tractor seat having means whereby a comfortable ride may be had therein by drivers irrespective of their weights.

A still further object of the invention is to provide an improved tractor seat whereby both the primary shocks and the rebounds of the shock cushioning spring means are greatly decreased.

A still further object of the invention is to provide an improved spring-suspended tractor seat having means whereby objectionable oscillations of the spring means are greatly decreased.

A still further object of the invention is to provide an improved spring-suspended tractor seat, improved means being provided therein to intercept a substantial portion of the energy of both primary shocks and rebounds, to convert it into heat and dissipate, instead of transmitting it in the form of impacts, cushioned or otherwise, to the operator's body.

A still further object of the present invention is to provide a tractor seat and suspension therefor of the foregoing nature, manufacturing of which does not require appreciable retooling from that used for conventional tractor seats, and does not require any changes in the design of the tractor itself.

It is an added object of the present invention to provide an improved tractor seat and suspension therefor of the foregoing nature, which is simple and rugged in construction, safe and dependable in operation, and relatively inexpensive to manufacture.

Further objects and advantages of this invention will be apparent from the following description and appended claims, reference being had to the accompanying drawings forming a part of this specification, wherein like reference characters designate corresponding parts in the several views.

Fig. 4 is a sectional view taken in the direction of the arrows on the section plane passed through the line 4—4 of Fig. 2.

Fig. 5 is a fragmentary side view of the seat springs illustrating means for absorbing energy of impacts.

Fig. 6 is a fragmentary side view of a seat suspension of a modified construction and embodying the present invention.

Fig. 7 is a sectional view taken in the direction of the arrows on the section plane passed through the line 7—7 of Fig. 6.

Fig. 8 is a side view of another modification.

Figure 1:
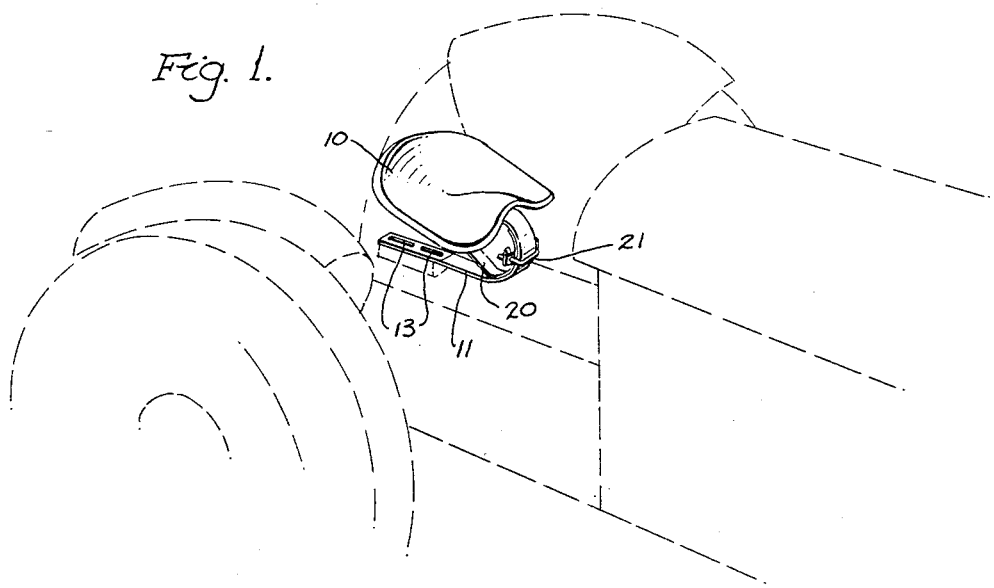
Fig. 1 is a perspective view of a tractor seat embodying the present invention, the tractor being indicated in dotted lines.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In accordance with the invention I discard the conventional practice of providing a seat spring on the basis of the maximum expected weight of the tractor operator, and provide a seat spring adapted to give a sufficiently soft ride to an operator of average or low weight. Such spring means have been found by actual experiments to give unusually easy and fatigue-free ride with unexpectedly little oscillation. At the present time I believe the above unexpected performance to be the result of making the natural frequency of the spring oscillations much slower than the usual frequency of vibrations and shocks received by a tractor in usual applications, such as in plowing or harrowing, and therefore out of resonance with them. However, I do not wish to be bound by my such theory.

In addition I provide means to dampen the natural oscillation of the C-shaped tractor seat spring by changing its mass at the bend thereof. Moreover, I utilize said means as a supplementary spring capable of accommodating tractor operators of the maximum expected weight, such as 250 pounds, and even more. The supplementary spring is manually and readily adjustable to accommodate tractor operators of such weights.

In the drawings, there is shown therein, by way of example, tractor seats embodying the present invention. Referring particularly to Figs. 1–4, the tractor seat illustrated therein comprises a seat pan 10 of any suitable design, carried by the free end 11a of a primary C-shaped spring 11, the other end 11b thereof being adapted to be secured in a manner well known in the art to the tractor structure, such as with the aid of screws 12 engaging the end 11b at elongated slots 13. The seat pan 10 is connected to the end 11a with the aid of a bracket 14 bolted or otherwise secured to the end 11a of the spring, and carrying a hinge pin 15 engaged by the pan bracket 16. By virtue of such a construction the seat pan 10 can be raised and folded out of the way, should the tractor operator desire to stand.

In accordance with the invention the spring 11 is made "soft" enough to respond sufficiently to a minimum expected weight of the tractor operator, such as a farm boy of 13–14 years of age. With one design of tractor and a spring made of 3" x ¼" strip steel with the dimension from the end of the spring to its bend being approximately 18", I attained the described construction by extending the free end of the spring for 3", thus providing an overhang designated in Fig. 2 by the letter o. By virtue of such an expedient, the rate of the spring was decreased sufficiently to accommodate comfortably the lightest operator. A spring of the same dimensional specifications but without the overhang was entirely too tiresome for average weight and light weight operators.

By such an expedient I also increased the length of the vibration or oscillation cycle or period of the spring, i. e., decreased the frequency of spring oscillations, thereby producing a seat of greatly superior riding characteristics. Such improved characteristics are believed to have resulted from the fact that the frequency of spring oscillations became out of resonance with the usual frequency of road shocks received by a tractor in usual operations, such as plowing.

Figure 2:
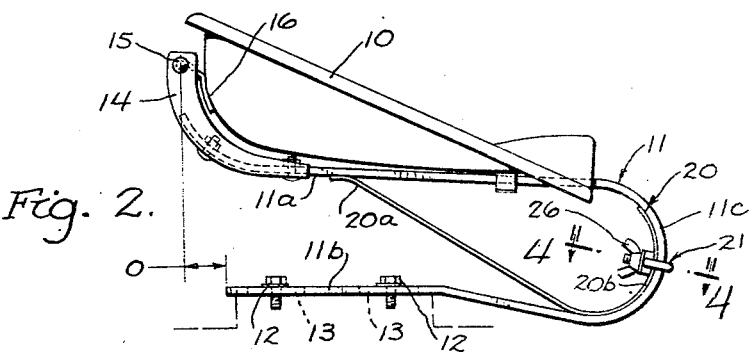
Fig. 2 is a side view of the seat of Fig. 1, showing the seat suspension means adjusted for use by a heavy person.

Means are provided in my improved seat to accommodate drivers of all possible weights up to the maximum expected weight of 250 pounds and more.. In the embodiment illustrated in Figs. 1–4, said means are exemplified by a supplementary spring 20 having a rounded end 20b fitted on the inside of the bend 11c of the primary spring 11 and connected thereto with a connector generally designated by the numeral 21. The free end 20a of the spring 20 extends rearwardly and may contact the spring 11 underneath the seat pan 10, if so adjusted. Fig. 2 illustrates such an adjustment of the spring 20, desired for heavy operators. As such an adjustment is being made, the spring 20 may be made either to touch the spring 11 lightly, or be pre-stressed by being set to exert some desired pressure on the spring 11 without the pan being loaded. With any of such adjustments of the spring 20, the combined resistance of the springs 11 and 20 becomes operative to support the load on the seat pan 10.

Figure 3:
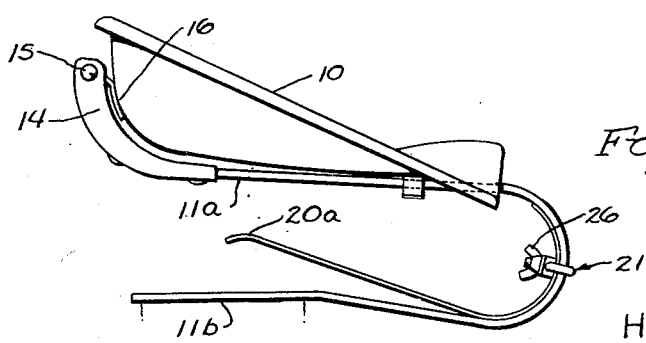
Fig. 3 is a view similar in part to Fig. 2, showing the seat suspension means adjusted for use by a person of light or average weight.

Fig. 3 shows the spring 20 adjusted to accommodate average and light weight operators. It will be understood that should the spring 20 be so adjusted by being moved in the clamp 21 as to have its free end 20a disposed intermediately of the positions shown in Figs. 2 and 3, operators of weights above average will be thus accommodated.

It is very important to appreciate that since the springs 11 and 20 have different frequencies of oscillation, they operate to dampen each other, and provide a greatly superior ride than would a spring of the same rate as the combined rates of springs 11 and 20 at any given adjustment.

The connector 21 comprises a U-shaped bolt clamp 25 having threaded ends receiving wing nuts 26 bearing on an arcuate pressure plate 27. The bolt clamp 25 may have, if desired, a bend 25a provided thereon and co-operating with an indent 28 on the spring 11 to locate the connection 21 and to prevent slippage thereof along the spring 20.

When the end 20a is in contact with the end 11a of the spring 11 (see Fig. 5), deflections of the springs cause their relative sliding at the surfaces of contact. By providing a piece 29 of frictional material, such as brake lining, on the end 20a, I have increased such friction and thus made it operate to consume the energy of impacts and rebounds by converting a considerable portion thereof into heat and dissipating the same. By virtue of such an expedient I have attained in my improved seat with the aid of very simple means a high degree of shock-absorbing and rebound-controlling characteristics, without the use of such devices as hydraulic shock absorbers.

In the construction of Fig. 6 the supplementary spring 30 is made coextensive with the bend 11c of the primary spring 11 and is provided with pieces 31 and 32 of frictional material at both of its ends. The spring 30 in its free condition has greater radius of curvature than the bend 11c. Tightening the nuts 33 of the connector 34 operates to increase the rate of the spring assembly.

Fig. 8 illustrates a seat having a seat pan 40 carried by the free end of a beam 41 hingedly mounted as indicated at 42 on the tractor structure. A primary spring 43 of the spiral type secured to the seat at its upper end is adapted to rest on the tractor structure at its lower end. A supplementary spiral spring 44 is secured to the tractor structure within the space contacted by the primary spring 43. An adjustable platform bracket 45 is secured to the seat 40 with the aid of a screw 50, insertable into one of the several holes provided in the boss 51 secured to the upper end of beam 41, said screw engaging a tapped hole in the bracket 45. The bracket 45 is adapted to bear on the supplementary spring 44 at a point of its downward movement determined by its adjustment. Adjusted to its full downward extent, the platform bracket 45 constantly bears on the spring 44. Such adjustment is similar to that illustrated in Fig. 2 and is used by heavy tractor operators. Operators of light and average weights adjust the brackets 45 all the way up. Intermediate adjustments are used by operators of intermediate weights. A safety strap such as 46 may be used to prevent excessive rebound of the seat pan 40, if desired. Slight resiliency in strap 46 is desirable.

While the present invention has been illustrated and described with reference to tractors, it may be successfully applied to other vehicles.

By virtue of providing the above disclosed seat and suspension therefor, the objects of the present invention listed above and numerous added advantages are attained.

I claim:

1. In a tractor having a seat, a suspension means for said seat, said suspension means comprising a C-shaped strip spring having its lower end secured to the tractor structure and its upper end carrying the seat, and a supplementary strip spring having one end adjustably connected to said primary spring at the bend thereof and a free end extending to support the seat-carrying end of said C-shaped spring, and an adjustable connection between said springs to effect desired positioning of the free end of said supplementary spring with respect to said seat-carrying end.

2. The construction defined in claim 1 and including friction material operatively interposed between said springs in a place where deflection of said springs causes relative sliding thereof.

References Cited in the file of this patent

UNITED STATES PATENTS

| | | |
|---|---|---|
| 100,083 | Stephan | Feb. 22, 1870 |
| 471,685 | Hunt | Mar. 29, 1892 |
| 477,123 | Johnson | June 14, 1892 |
| 501,782 | Harper | July 18, 1893 |
| 624,269 | Voltz | May 12, 1899 |
| 633,322 | Knapp | Sept. 19, 1899 |
| 736,665 | Wilson | Aug. 18, 1903 |
| 912,855 | King | Feb. 16, 1909 |
| 1,193,977 | Bereth | Aug. 8, 1916 |
| 2,191,317 | Howard | Feb. 20, 1940 |
| 2,500,496 | Nickelsen | Mar. 14, 1950 |